(12) United States Patent
Sharma et al.

(10) Patent No.: US 12,495,038 B2
(45) Date of Patent: Dec. 9, 2025

(54) METHOD OF AUTHENTICATING A CLIENT IN A CLIENT-SERVER ARCHITECTURE

(71) Applicant: UNIVERSIDADE DE COIMBRA, Coimbra (PT)

(72) Inventors: Rahul Sharma, Coimbra (PT); Bernardete Martins Ribeiro, Coimbra (PT); Alexandre Miguel Dos Santos Martins, Vialonga (PT); Fernando Amílcar Bandeira Cardoso, Coimbra (PT)

(73) Assignee: UNIVERSIDADE DE COIMBRA, Coimbra (PT)

( * ) Notice: Subject to any disclaimer, the term of this patent is extended or adjusted under 35 U.S.C. 154(b) by 254 days.

(21) Appl. No.: 18/287,881

(22) PCT Filed: Apr. 20, 2022

(86) PCT No.: PCT/IB2022/053676
§ 371 (c)(1),
(2) Date: Oct. 22, 2023

(87) PCT Pub. No.: WO2022/224153
PCT Pub. Date: Oct. 27, 2022

(65) Prior Publication Data
US 2024/0205217 A1  Jun. 20, 2024

(30) Foreign Application Priority Data

Apr. 21, 2021 (PT) .......................................... 117187
Jun. 11, 2021 (PT) .......................................... 117284

(51) Int. Cl.
*H04L 9/40* (2022.01)
*G06N 3/045* (2023.01)
*H04L 9/32* (2006.01)

(52) U.S. Cl.
CPC .......... *H04L 63/0838* (2013.01); *G06N 3/045* (2023.01); *H04L 9/3228* (2013.01); *H04L 63/20* (2013.01)

(58) Field of Classification Search
CPC ... H04L 63/0838; H04L 63/20; H04L 9/3228; G06N 3/045
See application file for complete search history.

(56) References Cited

U.S. PATENT DOCUMENTS

| | | | | |
|---|---|---|---|---|
| 2002/0083325 A1* | 6/2002 | Mediratta | ............... | H04L 63/20 |
| | | | | 713/182 |
| 2004/0034771 A1* | 2/2004 | Edgett | ................ | H04L 63/0846 |
| | | | | 713/153 |

(Continued)

OTHER PUBLICATIONS

Sharma, Rahul et al.: "Learning non-convex abstract concepts with regulated activation networks", Annals of Mathematics and Artificial Intelligence, Baltzer, Basel, CH, vol. 88, No. 11-12, (Mar. 21, 2020), pp. 1207-1235, XP037274759, ISSN: 1012-2443, DOI: 10.1007/S10472-020-09692-5.

(Continued)

*Primary Examiner* — Ellen Tran
(74) *Attorney, Agent, or Firm* — Rivka Friedman

(57) ABSTRACT

The present invention relates to a method for authenticating a Client in a Client-Server architecture. The method encodes the Client's input passcode using a Regulated Activation Network computational model to create a Hierarchical model. Depending upon a Policy shared between the Client and the Server, different combinations of encoded passcodes generated from the Hierarchical model, are selected. After every successful authentication operation, a new policy is generated. Because of these new policies, for every authentication attempt, the Client inputs the same passcode but the passcode communicated over the network is always different. The advantages of this method include random encoded (Continued)

passcode generation for the Client's identity verification. This randomness ensures that the generated encoded passcodes are never repeated in two successive authentication attempts. The use of Models, Policies, and the Client's passcode together makes the authentication method highly robust.

15 Claims, 3 Drawing Sheets

(56) References Cited

U.S. PATENT DOCUMENTS

| | | |
|---|---|---|
| 2006/0083228 A1* | 4/2006 | Ong .................... H04L 63/0823 370/389 |
| 2007/0130474 A1 | 6/2007 | Shatford |
| 2020/0036693 A1* | 1/2020 | Huynh .................. H04L 9/0863 |
| 2020/0120086 A1 | 4/2020 | Maresh et al. |

OTHER PUBLICATIONS

William Melicher et al.: "Fast, Lean and Accurate: Modeling Password Guessability Using Neural Networks", USENIX, USENIX, the Advanced Computing Systems Association, (Jan. 6, 2017), pp. 186-202, XP061025084.

International Search Report for PCT/IB2022/053676 Mailed on Aug. 19, 2022.

* cited by examiner

METHOD OF AUTHENTICATING A CLIENT IN A CLIENT-SERVER ARCHITECTURE

FIELD OF THE INVENTION

The present invention is enclosed in the field of authentication methods in a Client-Server Architecture. In particular, the present application relates to policy-based authentication methods for authenticating user(s), application(s), or device(s) and has its significance in the domain of Cybersecurity application-layer authentication.

PRIOR ART

A problem present in the state of the art is Client Identity verification. Client Identity verification can be done in the following ways: i) password-based authentication; ii) multi-factor authentication; iii) Certificate-based authentication; iv) Token-based authentication.

However, any of these methodologies presents problems. Notably, password-based authentication can be subject to phishing attacks, password guessing, etc. The multi-factor authentication is prone to situations when the devices are lost or unavailable to generate authentication codes. In its turn, certificate-based authentication is vulnerable to the theft of private keys. Finally, token-based authentication can be expensive when generating very secure tokens. If the token is leaked due to an unsecured connection, it can create several problems.

The present solution is intended to overcome such issues innovatively.

SUMMARY OF THE INVENTION

It is, therefore, an object of the present invention, a method for authenticating a Client in a Client-Server Architecture. The method developed can be used by application(s) or device(s) to authenticate user(s), application(s) or device(s). These entities are further referred to as "Client" for the present application.

This method has three main components: Data, Model, and Policies. The data is made up of synthetic and real passwords of Clients. The Model is generated using the data and a computational modeling technique named Regulated Activation Network—RAN-[1]. Policies are created using the Model.

This new method for authenticating Clients in a Client-Server architecture has its significance in the domain of cybersecurity application-layer authentication. More particularly, the Client's input passcode is encoded using the RAN Model. Depending upon the Policy shared between the Client and Server, the different combinations of encoded passcodes are selected based on the number of layers and number of nodes in each layer in the Model generated. After every successful operation, a new Policy is generated and shared between the Client and the Server.

Because of these new policies, the Client inputs the same passcode for every authentication attempt, but the passcode communicated over the network is always different. This method is different from the prior art at least because it uses a Computational Model as part of the authentication procedure and uses Policies generated from the Model and the Client's passcode to generate the Client's encoded identity verification code. The advantages in respect of the prior art include random encoded passcode generation for the client's identity verification. This randomness also ensures that the generated encoded passcodes are never repeated in two successive authentication attempts.

For that purpose, in an advantageous configuration of the present invention method, it comprises a Model creation process, a Client creation process, and a Client authentication process.

The Model creation process is responsible for generating a Hierarchical model based on feeding a RAN computational model with a randomly generated N-dimensional input Dataset.

In its turn, the Client creation process generates a Client's Encoded Passcode Hierarchy by feeding the Hierarchical model with a Client's passcode. The Client's Encoded Passcode Hierarchy comprises a set of encoded passcodes representing encoded versions of the Client's passcode, and it is saved on the Server. The Client creation process is also responsible for generating a Policy for the Client's next authentication attempt and sharing it between the Client and the Server.

On the Client-side, the Client authentication process generates a Client's Encoded Passcode Hierarchy by feeding the Hierarchical Model with the Client's passcode. It also generates a Client's Encoded passcode using the Policy shared between the Client and the Server. Additionally, it authenticates the Client at the server-side if the Client's encoded passcode matches an expected encoded passcode generated at the server, using the saved Client's Encoded Passcode Hierarchy and the shared Policy. Finally, a new Policy is generated if the Client is successfully authenticated, which is then shared between the Client and the Server for the next Client's authentication attempt.

DETAILED DESCRIPTION

The more general and advantageous configurations of the present invention are described in the Summary of the invention. Such configurations are detailed below in accordance with other advantageous and/or preferred embodiments of implementation of the present invention.

The authentication method of the present invention comprises a Model creation process, a Client creation process, and a Client Authentication process. Additionally, the method can be implemented in a centralized manner such that the Model creation process, the generation of the Client's Encoded Passcode Hierarchy (4) on the Client creation process, and the generation of the Policy (5), (5.1) on both the Client creation process and Client authentication process are executed at the server's side. The Client (12) stores the Hierarchical Model (3) and the Policy (5), (5.1).

Alternatively, the method can be implemented in a decentralized manner wherein the Model creation process, the generation of the Client's Encoded Passcode Hierarchy (4), and the generation of the Policy (5), (5.1) on both the Client creation process and Client creation authentication process are executed at the Client's side. The Server (9) stores the Client's Encoded Passcode Hierarchy (4), the Policy (5), (5.1), and the respective Client's ID (10). Along with the strengths related to the randomness in encoded passcode generation, this decentralized manner empowers the Client (12) machine to have full control over the creation and store of the main authentication-related credentials (i.e., Model, Passcode, and Policies.) and limits the role of servers (9) in saving the Clients (12) related credentials. In fact, the Model (3) generation and its update are independent of the Server (9), i.e., the Client (9) only notifies the Server (9) with the passcode hierarchy (4) if a new Model (3) is generated or a new Client (12) is created. Therefore, an attack on the server (9) does not compromise the Client's and authentication model related credentials.

Model Creation Process

In the centralized approach, the creation of Model (3) is executed on the server-side by the server administrator, selecting the amount of data to build the model. Additionally, the server administrator also sets the hyperparameters of the RAN's model (2) that further builds the Model (3). When Model (3) is built, it is made available to all the Clients (12). Alternatively, in the case of a decentralized approach, the creation of the Model (3) is a Client (12) operation, where the client-side application randomly generates a numerical dataset considering the client's passcode minimum and maximum values. The Client's application also arbitrarily selects the hyperparameters of the RAN's model, further building the model. When the model is built, it is saved on the client's device for further usage.

Figure 1:
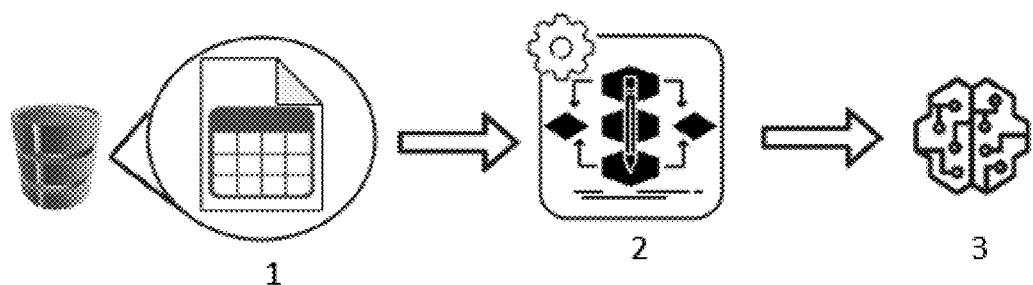
FIG. 1 shows the Model Creation stage of the method of the present invention. As shown to create the model, an input dataset (1) is fetched from a database and fed to the Computational Model (2) named Regulated Activation Network (RAN). RAN generates a Hierarchical Model (3), as shown in FIG. 2.
Figure 2:
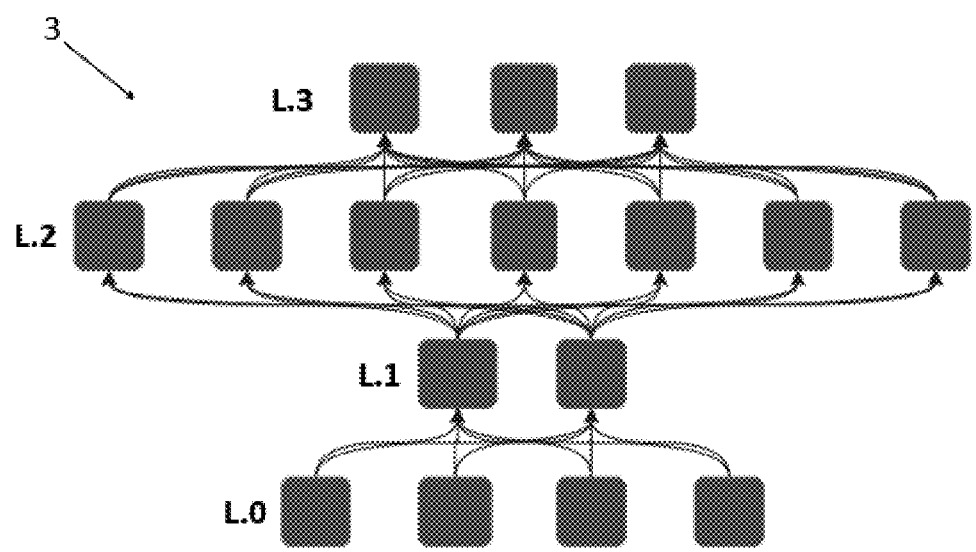
FIG. 2 shows an example of a 4-Layered Model (3) generated using RAN's Modelling (2). Layer L.0 is the input layer where 4 nodes depict the dimension of the input data, i.e., the dataset used to build this model has 4 columns. The Layers L.1, L.2, and L.3 are the dynamically generated layers where each node is an abstract representative of the input data.
Figure 4:
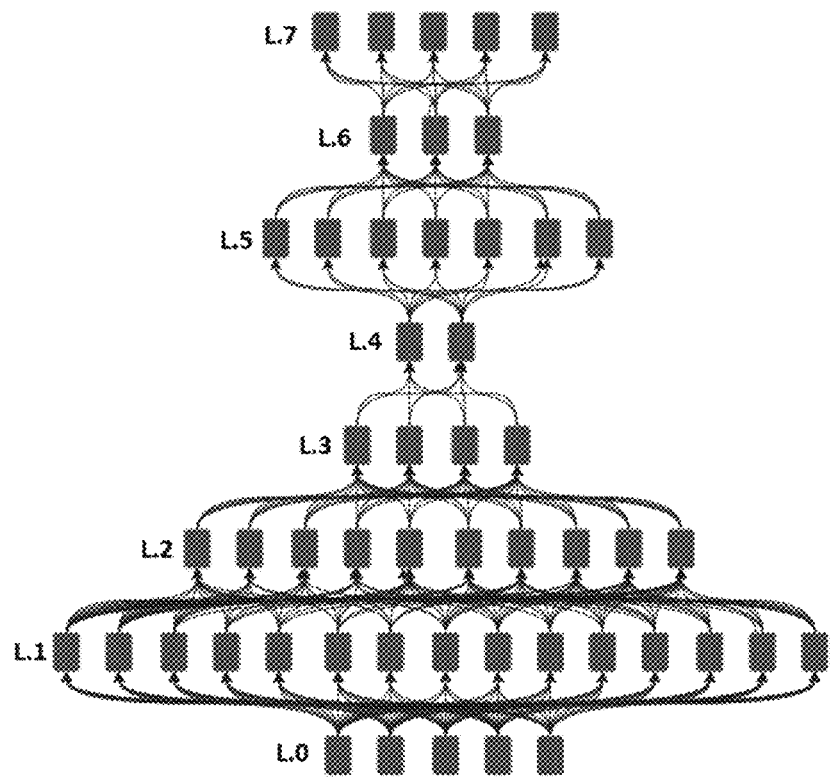
FIG. 4 shows a Model (3) of 8 Layers (L.0 to L.7) that was generated using the RAN's modeling (2) to prove the concept of authentication using RAN's model. Layer L.0 has 5 Nodes which depicts that the dataset consists of 5 columns.

When an existing Client (12) logs in to the Server (9), it is authenticated by the old model (3) first, then its stored input passcode (7) is used to generate a new encoded passcode (6) set using the newly generated model (3). Therefore, new Models (3) can be arbitrarily generated, and the Client's model (3) will be updated automatically. These intermittently changed Models (3) drastically add to the variability induced by the random policy generation during the policy generation. This has been verified by regularly changing the Model (3) while testing the authentication and Client creation operations. In FIG. 1, we can see three entities and their flow, which are described as follows:

a. First, it is the dataset (1). The dataset (1) is synthetically created by the server administrator, in the case of a centralized approach, having a predefined dimension, i.e., the features (or columns, or attributes). In the case of a decentralized approach, the dataset (1) is synthetically created by the Client's application automatically. The dimension of the dataset, i.e., the features (or columns, or attributes), are decided by the Client's input passcode (7). Each data unit is an integer value between a Minimum and Maximum Integer. The number of instances, i.e., the size of the data points, is also decided by the server administrator or the Client's application, and in one embodiment of the method of the present invention, it is in the range of 1 to 2000. In the case of a centralized approach, in the process of creating a new Client (12), it's passcode (7) may be verified in light of the specifications of the dataset (1) that the server administrator defined. If there is a match, the Client (12) is registered, and its passcode (7) is appended to the dataset (1). Alternatively, in the decentralized approach, when creating a new Client (12), their passcode (7) is merged with the generated data (1) and passed for model generation (2). For this proof of concept, a dataset of 1000 instances was generated, the dataset has 5 dimensions, and the data value of each unit is an integer between 1 and 1000.

b. Second is the Computational Model (2). The computational model used is the RAN [1]. This modeling technique can generate a hierarchical model from the dataset (1), as shown in FIGS. 2 and 4. For the proof of concept, it is configured the RAN's modeling (2) to use K-means as concept identifier. The 'k' of the K-means was set to 15, 10, 4, 2, 7, 3, & 5 to determine the number of nodes for Layers L.1, L.2, L.3, L.4, L.5, L.6, L.7, and L.8 respectively. This configuration can be changed by the server administrator or by the Client application arbitrarily, in the case of a centralized or decentralized approach, respectively.

c. Third is the Model (3). This multi-layered model is generated using the RAN's modeling technique (2). In an embodiment, the generated RAN's model (2) has 8 Layers, wherein L.0 is the Input layer, and the other 7 Layers (L.1 to L.7) are the Abstract Concept Layers, as shown in FIG. 4.

Client Creation Process

Figure 5:
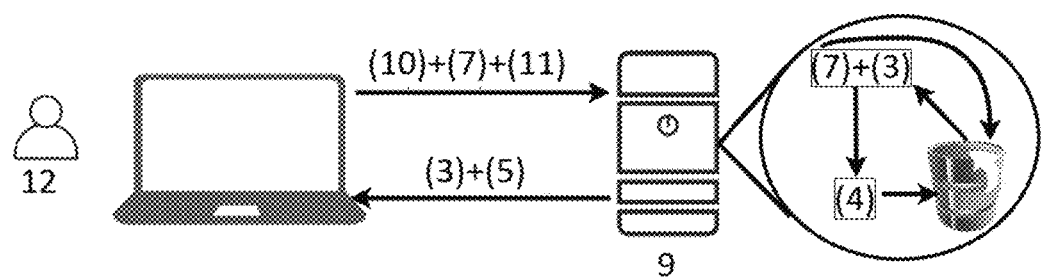
FIG. 5 refers to an embodiment of the method of the present invention showing the Client registration process. In the procedure, the Client (12) sends to the server (9) the Client's ID (10), a Token (11) provided by the server (9), and the Client's input Passcode (7). The server (9) verifies the credential's provided and then registers the Client (12) and responds with the Model (3) and Policy (5) for the next authentication attempt.

In a centralized approach, the Client (12) sends a Client creation request with the Client's ID (12), a passcode (7), and a token (11). Upon successful token (11) validation, the Client's passcode (7) is used as input to the RAN's model (2) to generate the encoded passcode (6). The encoded passcodes contained in the Client's encoded passcode hierarchy (4) are stored for the Client's authentication, and the Client's passcode (7) is stored to create newly encoded passcodes when the models (3) are changed. FIG. 5 illustrates the Client creation process. This process may be described as follows:

a. Ensure that the RAN's model (2) is already generated and stored at the Server (9);
b. Through REST API, the Client (12) provides a passcode (7), a token (11), i.e., an arbitrarily large integer provided by the server administrator, and the client's ID (10) to the Server;
c. The Server (9) verifies the Client's passcode (7) and token (11) if it is according to the specifications of the dataset (1) created by the server administrator and the expected token at the Server (9). If any of the two fails to verify, then a FAILURE message is reverted to the Client (12);
d. If both are verified, the Client's passcode (7) is normalized between 0 and 1 and passed to the RAN's model (2) to generate an Encoded Passcode Hierarchy (4) for the Client's passcode (7) and save it for the Client's information at the Server (9);
e. The Server (9) then generates a Policy (5) of arbitrary size using the RAN's model (2) architecture specifications. The Policy (5) size varies between a minimum and maximum integer and is decided by the server administrator. In an embodiment, the range of Policy (5) was set between 5 and 60;
f. The generated Policy is saved with the Client's information as an expected Policy (5) for the next authentication attempt by the Client (12).
g. The copy of Policy (5) and the Generated Model (3) is sent back to the Client (12) through the REST interface.
h. The Model (3) and the Policy (5) are saved in the Client's system.
i. The process terminates.

Figure 7:
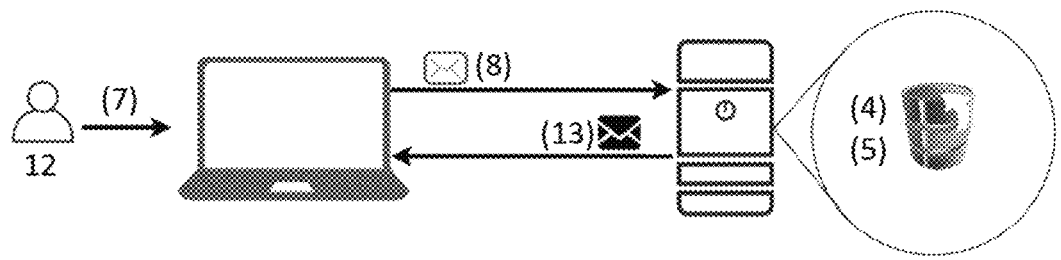
FIG. 7 refers to an embodiment showing the Client creation and Authentication procedure of the decentralized approach of the method of the present invention. For registration, the Client (12) sends (8) to the server (9) the Client's ID (10), a Token (11) provided by the server (9), the encoded passcode hierarchy (4), and the policy (5) for the next authentication after registration. The Server (9) verifies the credential's provided and then registers the client (12) and responds (13) with the registration failure or success message. For Authentication, the client (12) only sends (8) the encoded passcode (6) and the policy (5) for the next authentication, and the server responds (13) to the client with a failure or success message.

Alternatively, in the case of a decentralized approach, the Client (12) sends a Client creation request with the Client's ID (10), a token (11), Encoded Passcode Hierarchy (4), and Policy (5). Upon successful token (11) validation, the Client (12) is acknowledged with a success message. FIG. 7 describes the Client creation process. This process may be described as follows:

a. Ensure that the RAN's model (2) is already generated and stored at the Client's device;
b. Through REST API, the Client (12) provides a token (11), i.e., an arbitrarily large integer provided by the server administrator, Client's ID (10), and Encoded Passcode Hierarchy (4), and Policy (5) to the Server (9).
c. The Server verifies the token: If token verification is successful, then a new Client (12) is created with the unique ID (10), provided by the Client (12) along with the Client's Encoded Passcode Hierarchy (4), and Policy (5) for the next authentication. All these credentials are saved on the Server (9). A response is sent to the Client (12) stating the successful creation of the Client (12). If the token is not verified, then a 'Process Unsuccessful' response is sent to the Client (12).

Client Authentication Process

This process verifies the Client's identity. In this authentication process, three things are essential: first, the Client's input passcode (7); second, the Model (3) shared between Client (12) and Server (9); and third, the Policy (5) shared between Client (12) and Server (9). When a Client (12) attempts to authenticate, it's passcode (7) is passed through the Model (3) to produce the Client's Encoded Passcode Hierarchy (4). Further, an Encoded Passcode (6) is created using the Policy (5) and the Client's Encoded Passcode Hierarchy (6). This Encoded Passcode (6) is sent to the Server (9). In the case of a decentralized approach, a new Policy (5.1) for the next authentication is also sent to the Server (9).

To verify the Client (12), the Server (9) loads the Client's Encoded Passcode Hierarchy (4) saved on the Server (9) and the Policy (5) that was shared between the Client (12) and the Server (9). If both the encoded passcodes match, the Client (12) is acknowledged with an authentication success message. In the case of a centralized approach, a new Policy (5.1) is also sent to the Client (12) to be used in the next authentication approach. In the case of a decentralized approach, the current Policy (5) at the server (9) is replaced by the new Policy (5.1) sent by the Client (12). If both the encoded passcodes do not match, the Client (12) is acknowledged with an authentication failure message.

The method developed ensures that in two consecutive authentication attempts by a Client (12), the Encoded Passcode (6) is never repeated, which is confirmed by keeping a log of Policies (5) used in the Authentication operations. Table 1 lists the Iteration Log obtained that proves it. Validation was performed from 100 authentication operations until 1 million authentication attempts in different experiment sets. It can be seen that until 10,000 authentication operations, no two consecutive Policies (5) were repeated. When the authentication iteration grew to 50,000 attempts, it can be observed that Policies (5) have repeated, but two Policies (5) are never observed one after the other in two consecutive authentication attempts.

TABLE 1

| Authentication Iteration | Index of Consecutive Repeated Policy | Count of Consecutive Repeated Policy | Unique Policy Count | Repeated Policy Count |
|---|---|---|---|---|
| 100 | [ ] | 0 | 100 | 0 |
| 500 | [ ] | 0 | 500 | 0 |
| 1,000 | [ ] | 0 | 1,000 | 0 |
| 5,000 | [ ] | 0 | 5,000 | 0 |
| 10,000 | [ ] | 0 | 10,000 | 0 |
| 50,000 | [ ] | 0 | 49,995 | 5 |
| 3,13,353 | [ ] | 0 | 3,13,295 | 58 |
| 5,73,583 | [ ] | 0 | 5,73,383 | 200 |
| 8,33,245 | [ ] | 0 | 832,851 | 394 |
| 10,00,000 | [ ] | 0 | 9,99467 | 533 |

Figure 6:
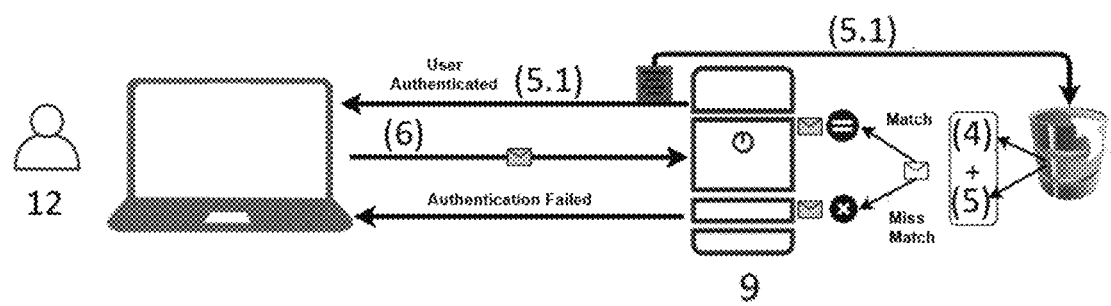
FIG. 6 refers to an embodiment of the method of the present invention showing the Client's authentication operations. The Figure shows all the entities required for the authentication of the Client (12), i.e., the Client's input passcode (7), Hierarchical Model (3), Shared Policy (5), Encoded Passcode Hierarchy (4), and the Encoded Passcode (6). The Figure also shows the flow of the authentication process, both from the Client (12) and Server (9).

FIG. 6 shows the entire Client authentication process in case of a centralized approach. The process may be as follows:

a. Ensure that the RAN's Modelling (2) Library is available at the Client's device;
b. The new RAN's model instance is created and loaded with the RAN's model (3) provided by the Server (9);
c. The Client (12) enters its passcode (7), and it is normalized between 0 and 1 and passed to the RAN's model (3) to generate the Encoded Passcode Hierarchy (4) of the Client's passcode (7).

d. The shared Policy (5) provided by the Server (9) is applied to the Encoded Passcode Hierarchy (4) of the Client's passcode (7), and an Encoded Passcode (6) is generated for the Client's verification at the Server (9).

e. The Encoded Passcode (6) is sent to the server (9) via REST interface along with the Client's ID (10);

f. Upon receiving an authentication request, the Server (9) checks if the Client's ID (10) exists; if not, then a failure message is reverted to the Client (12);

g. If the Client's ID (10) exists, the Client's saved Encoded Passcode Hierarchy (4) is loaded along with the expected Policy (5). This Policy (5) is applied to the Client's saved Encoded Passcode Hierarchy (4) to generate an encoded passcode. This encoded passcode is compared with the Encoded Passcode (6) sent by the Client (12). If the passcodes do not match, the Client (12) is reverted with an authentication failure message;

h. If the passcodes match, the Client (12) is verified;

i. A new Policy (5.1) is generated by the Server (9), and one copy of the Policy (5.1) is saved with the Client's information at the Server (9) as an expected Policy (5) for the Client's next authentication attempt;

j. The other copy of the Policy (5.1) is sent to the Client along with a successful authentication message via REST interface;

k. At the Client (12), if the response is a successful authentication message, then save the new shared Policy (5.1) sent by the Server (9) for the next login attempt.

FIG. 7 also shows the entire authentication process in the case of a decentralized approach. The Process may be as follows:

a. Ensure that the RAN's Modelling (2) Library is available at the Client's device;

b. The new RAN's model instance is created and loaded with the RAN's model (3) saved on the Client's device;

c. The Client (12) enters its passcode (7), and it is normalized between 0 and 1 and passed to the RAN's model (3) to generate the Encoded Passcode Hierarchy (4) of the Client's passcode (7);

d. The shared Policy (5) is applied to the Encoded Passcode Hierarchy (4) of the Client's passcode (7), and an Encoded Passcode (6) is generated for the Client's verification at the Server (9);

e. A new Policy (5.1) is created;

f. The Encoded Passcode (6) is sent to the Server via REST interface along with the Client's ID (10) and the new Policy (5.1);

g. Upon receiving an authentication request, the Server (9) checks if the Client's ID (10) exists; if not, then a failure message is reverted to the Client (12);

h. If the Client's ID (10) exists, the Client's saved Encoded Passcode Hierarchy (4) is loaded along with the expected Policy (5). This Policy (5) is applied to the Client's saved Encoded Passcode Hierarchy (4) to generate an encoded passcode. This encoded passcode is compared with the Encoded Passcode sent by the Client (12). If the passcodes do not match, the Client (12) is reverted with an authentication failure message;

i. If the passcodes match, the Client (12) is verified;

j. The New Policy (5.1) sent by the Client (12) is saved at the Server (9) as an expected Policy (5) for the Client's next authentication attempt.

Figure 3:
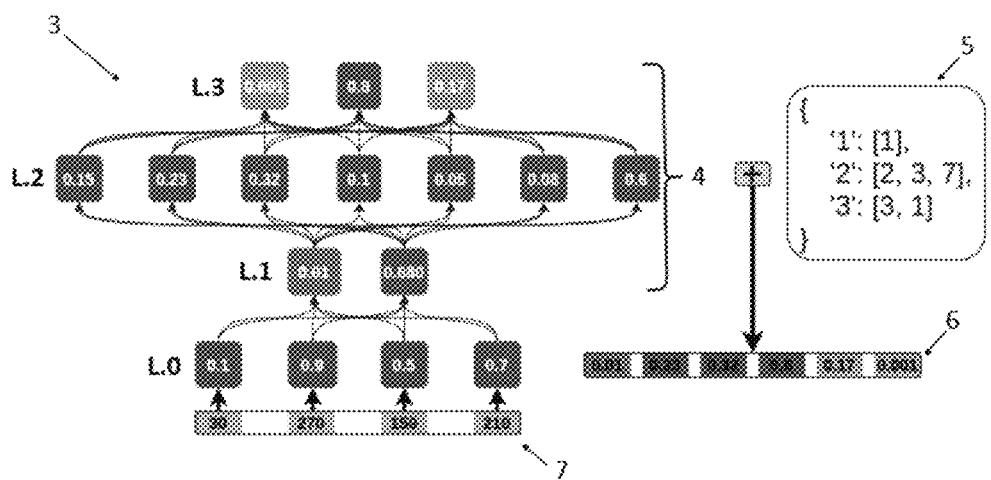
FIG. 3 shows an example of the Client's input Passcode (7) transformation into an Encoded Passcode (6). The Figure shows that all the layers (L.1 to L.3), except the input Layer L.0, form the Client's Encoded Passcode Hierarchy (4), where each layer (L.1 to L.3) stores an encoded version of the Client's Passcode (7). The Policy (5) is a JSON format where the 'Key': [LIST] pair determines the Layer: [Node(s) index(s)] respectively. Based on this Policy, the encoded Passcodes are grouped to form the encoded passcode.

The robustness of the developed authentication method, with respect to randomness, is achieved through the Policies (5). The Policy (5) itself is derived from the architecture of the Model (3) generated using RAN (2). A Policy (5) may be made using the following steps:

a. The size of the Policy (5) is decided by the server administrator, in the case of a centralized approach, by choosing a number in a range of two integer numbers. Alternatively, if a decentralized approach is considered, the size of the Policy (5) is arbitrarily decided by a Client's application. The proof of concept used the range of Policy sizes between 5 and 60.

b. The randomly chosen size of the Policy (5) determines the number of elements that will be in the policy;

c. Each element of the Policy (5) is a pair of LayerID and List of Node(s) in the Layer. The Policy elements may be made as follows:

i. A Layer (L.1 to L.β-1) of the Model (3) is randomly chosen. Note, the range of layers is always between L.1 to L.β-1, where B is the number of layers in the Model (3). Layer 0 is never used in the Policy (5) because it can reveal the Client's passcode (7);

ii. Once the layer (L.1 to L.β-1) is chosen, then a list of one or more nodes is created by arbitrarily picking one or more nodes from the chosen layer (L.1 to L.β-1);

d. The generated Policy (5) looks like a JSON script, as shown in FIG. 3, where the JSON Keys are the LayerID of the Model and JSON values are the node ID(s) of the layer.

The Client's Encoded Passcode Hierarchy (4) can be generated by propagating the Client's input passcode (7) to the generated RAN's model (3). This process encodes the Client's input passcode (7) into varied sizes based on the size of the layers of the Model (3). For example, in FIG. 3 the input passcode (7) is [30, 270, 150, 210]. At the input layer, L.0, the passcode (7) is normalized between 0 and 1 (by dividing them by 300), but the size of the passcode (7) remains the same. In Layer L.1 dimension of input is reduced to 2 with encoded values [0.01, 0.68]. At Layer L.2 the dimension was expanded to 7 with encoded values [0.15, 0.23, 0.32, 0.1, 0.05, 0.08, 0.6] and the last layer L.3 the dimension is again reduced to size 3 with encoded values [0.001, 0.8, 0.17]. These encoded input passcode at different layers are seen as a hierarchy of the Client's input passcode (4). Note, the Encoded Passcode Hierarchy (4) of the Client (12) does not include the input Layer L.0 because it can reveal the Client's input passcode (7). Therefore, the Encoded Passcode Hierarchy (4) of the Client (12) consists of encoded passcodes from Layer L.1 onwards until the highest layer (L.β-1) in the Model's architecture. At the Server (9), this Encoded Passcode Hierarchy (4) exists in a persistent form, i.e., it is saved with the Client's profile in place of the Client's Passcode. This hierarchy (4) is generated on the Client's side whenever the Client (12) attempts to perform the authentication. In the case of a decentralized approach, the Encoded Passcode Hierarchy (4) is controlled by the Client (12), i.e., whenever the Client (12) wants, can replace the current Encoded Passcode Hierarchy (4) with a new one.

The Encoded Passcode (6) is the actual passcode that is sent by the Client (12) via the internet (for example) to the Server (9) for authentication. The Encoded Passcode generation is depicted in FIG. 3. This Encoded passcode (6) is generated twice in one authentication attempt:

a. First, at the Client-side, where the Client (12) enters its passcode to the RAN's model (3) to generate its Encoded Passcode Hierarchy (4), then using the shared Policy (5), the Encoded Password (6) is generated. In FIG. 3, the shared Policy (5) selects the encoded passcode at node 1 from Layer L.1, nodes 2, 3, & 7 at Layer L.2, and node 3 & 1 from Layer L.3. These selected encoded passcodes are grouped to form the Encoded Passcode (6), which is sent to the Server (9) for verification along with the Client's ID;
b. Second, on the Server side, upon receiving a legitimate authentication request, the server loads the Client's Encoded Passcode Hierarchy (4) saved on the Server (9). Then the Server (9) loads the expected Policy (5) and uses it to determine the expected Encoded Passcode (6) from the Client (12).

EMBODIMENTS

In a preferred embodiment of the method of the present invention, it is comprised of a Model creation process, a Client creation process, and a Client authentication process; wherein,
the Model creation process generates:
(i) a Hierarchical model (3) based on feeding a Regulated Activation Network computational model (2) with a randomly generated N-dimensional input Dataset (1);
the Client creation process generates:
(i) a Client's Encoded Passcode Hierarchy (4) by feeding the Hierarchical model (3) with a Client's passcode (7); the Client's Encoded Passcode Hierarchy (4) being saved on the Server (9) and comprises a set of encoded passcodes representing encoded versions of the Client's passcode (7);
(ii) a Policy (5) for the Client's next authentication attempt, which is shared between the Client (12) and the Server (9);
and
the Client authentication process:
(i) generates, at the Client-side, a Client's Encoded Passcode Hierarchy (4) by feeding the Hierarchical Model (3) with the Client's passcode (7) and a Client's Encoded passcode (6) using the Policy (5) shared between the Client (12) and the Server (9);
(ii) authenticates the Client (12) at the server-side if the Client's encoded passcode (6) matches an expected encoded passcode generated at the server (9) using the saved Client's Encoded Passcode Hierarchy (4) and the shared Policy (5);
(iii) generates a new Policy (5.1) if the Client (12) is successfully authenticated, which is shared between the Client (12) and the Server (9) for the next Client's authentication attempt.

In another embodiment of the method, the input Dataset (1) is formed by data units of an integer type, and each data unit is an integer value between a minimum and maximum integer. Preferably each data unit is an integer between 1 and 2000.

In another embodiment of the method, the RAN model (2) is configured to implement a k-means algorithm as a concept identifier.

In another embodiment of the method, the Hierarchical Model (3) comprises a plurality of B layers, each layer comprising at least one node, determining the size of the layer, and wherein layer L.0 is the input layer and comprises N nodes, being N the dimension of the input Dataset (1); and layers L.1 to L.β-1 are dynamically generated layers, each of said layers storing an encoded passcode.

In another embodiment of the method, in the Client creation process, the Client's passcode (7) is inputted in layer L.0 of the Hierarchical Model (3) and the layers L.1 to L.β-1 are dynamically generated layers, each of said layers storing an encoded passcode representing an encoded version of the Client's passcode (7).

In another embodiment of the method, the Client's Encoded Passcode Hierarchy (4) is formed by layers L.1 to L.β-1 of the Hierarchical Model (3).

In another embodiment of the method, the process of generating a Policy (5), (5.1) is based on the Hierarchical Model (3) and comprises the following steps:
selecting a number of elements for the Policy; preferably said number being in a range of two integer numbers, even more preferably, said number being between 5 and 60;
creating the selected number of Policy elements, each element being a pair of layer ID and a List of node(s) in said layer and being formed by:
randomly selecting a layer of the Hierarchical Model (3); the selection being made between layer L.1 and layer L.β-1;
creating a list by arbitrarily picking one or more nodes from the selecting layer.

In another embodiment of the method, the Policy (5), (5.1) is a JSON script where the JSON keys are the layer-ID of the Hierarchical Model (3), and the JSON values are the node ID(s) of the layer.

In another embodiment of the method, in the Client creation process, the Client's Encoded Passcode Hierarchy (4) is generated by encoding the Client's passcode (7) into varied sizes based on the sizes of each layer (L.1 to L.β-1) of the Hierarchical Model (3).

In another embodiment of the method, in the Client authentication process, the generation of the Client's Encoded Passcode (6) comprises the following steps, on the Client side:
(i) entering the Client's passcode (7) to the Hierarchical Model (3) to generate the Client's Encoded Passcode Hierarchy (4);
(ii) applying the Policy (5) to the Client's Encoded Passcode Hierarchy (4) to generate the Client's Encoded Passcode (6), being formed by grouping together the respective encoded passcodes.

In another embodiment of the method, in the Client authentication process, the generation of the expected encoded passcode (6) at the server-side comprises the following steps:
(i) upon receiving an authentication request by the Client (12), the server loads the Client's Encoded Passcode Hierarchy (4), and the Policy (5) shared with the Client (12);
(ii) applying the Policy (5) to the Client's Encoded Passcode Hierarchy (4) to generate the expected encoded passcode (6), being formed by grouping together the respective encoded passcodes.

In another embodiment of the method, the Model creation process, the generation of the Client's Encoded Passcode Hierarchy (4) on the Client creation process and the generation of the Policy (5), (5.1) on both the Client creation process and Client authentication process are executed at the server's side; and the Client (12) stores the Hierarchical Model (3) and the Policy (5), (5.1). In this embodiment, the Client creation process comprises the following steps:
a Client (12) sends a Client creation request to a server administrator; the request comprising a Client's ID (10), a Client's passcode (7), and a token (11);
upon successful token (11) validation by the server administrator, the Client's passcode (7) is used as input to the Regulated Activation Network computational model (2) to generate a Hierarchical model (3) and a respective Client's Encoded Passcode Hierarchy (4) for said Client's passcode (7);

the Client's passcode (7) and the Client's Encoded Passcode Hierarchy (4) are saved at the server (9) as the Client's information;

the server (9) generates a Policy (5) based on the Hierarchical model (3), and the generated policy (5) is saved at the server (9) with the Client's information as an expected Policy (5) for the next authentication attempt by the Client (12);

a copy of the Policy (5) and the Hierarchical model (3) is sent to the Client (12) to be saved in the Client's system.

In another embodiment of the method, the Model creation process, the generation of the Client's Encoded Passcode Hierarchy (4), and the generation of the Policy (5), (5.1) on both the Client creation process and Client creation authentication process are executed at the Client's side; and the Server (9) stores the Client's Encoded Passcode Hierarchy (4) and the Policy (5), (5.1). In this embodiment, the Client's creation process comprises the following steps:

a Client (12) sends a Client creation request to a server administrator; the request comprising a Client's ID (10), a Client's Encoded Passcode Hierarchy (4), a Policy (5), and a token (11) that is provided by the server administrator;

upon successful token validation by the server administrator, the Client (12) is created with a unique ID;

server (9) stores the Client's ID (10), the Client's Encoded Passcode Hierarchy (4), and the Policy (5) for the next authentication attempt by the Client (12).

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition of all such combinations.

REFERENCES

[1] Sharma R, Ribeiro B, Miguel Pinto A, Cardoso F A. Exploring Geometric Feature Hyper-Space in Data to Learn Representations of Abstract Concepts. Applied Sciences. 2020; 10(6):1994. https://doi.org/10.3390/app10061994.

The invention claimed is:

1. Method for authenticating a Client in a Client-Server architecture, the method comprising a Model creation process, a Client creation process, and a Client authentication process; wherein, the Model creation process generates:
(i) a Hierarchical model (3) based on feeding a Regulated Activation Network computational model (2) with a randomly generated N-dimensional input Dataset (1);

the Client creation process generates:
(i) a Client's Encoded Passcode Hierarchy (4) by feeding the Hierarchical model (3) with a Client's passcode (7); the Client's Encoded Passcode Hierarchy (4) being saved on the Server (9) and comprises a set of encoded passcodes representing encoded versions of the Client's passcode (7);
(ii) a Policy (5) for the Client's next authentication attempt, which is shared between the Client (12) and the Server (9);

and the Client authentication process:
(i) generates, at the Client-side, a Client's Encoded Passcode Hierarchy (4) by feeding the Hierarchical Model (3) with the Client's passcode (7) and a Client's Encoded passcode (6) using the Policy (5) shared between the Client (12) and the Server (9);
(ii) authenticates the Client (12) at the server-side if the Client's encoded passcode (6) matches an expected encoded passcode generated at the server (9) using the saved Client's Encoded Passcode Hierarchy (4) and the shared Policy (5);
(iii) generates a new Policy (5.1) if the Client (12) is successfully authenticated, which is shared between the Client (12) and the Server (9) for the next Client's authentication attempt.

2. Method according to claim 1 wherein the input Dataset (1) is formed by data units of an integer type; each data unit is an integer value between a minimum and maximum integer; preferably, each data unit is an integer between 1 and 2000.

3. Method according to claim 1 wherein the Regulated Activation Network computational model (2) is configured to implement a k-means algorithm as a concept identifier.

4. Method according to claim 1, wherein the Hierarchical Model (3) comprises a plurality of $\beta$ layers, each layer comprising at least one node, determining the size of the layer, and wherein layer L.0 is the input layer and comprises N nodes, being N the dimension of the input Dataset (1); and layers L.1 to L.$\beta$-1 are dynamically generated layers, each of said layers storing an encoded passcode.

5. Method according to claim 4, wherein in the Client creation process and the Client authentication process, the Client's passcode (7) is inputted in layer L.0 of the Hierarchical Model (3) and the layers L.1 to L.$\beta$-1 are dynamically generated layers, each of said layers storing an encoded passcode representing an encoded version of the Client's passcode (7).

6. Method according to claim 5, wherein the Client's Encoded Passcode Hierarchy (4) is formed by layers L.1 to L.$\beta$-1 of the Hierarchical Model (3).

7. Method according to claim 1 wherein the process of generating a Policy (5), (5.1) is based on the Hierarchical Model (3) and comprises the following steps:

selecting a number of elements for the Policy; preferably said number being in a range of two integer numbers, even more preferably, said number being between 5 and 60;

creating the selected number of Policy elements, each element being a pair of layer ID and a List of node(s) in said layer and being formed by:

randomly selecting a layer of the Hierarchical Model (3); the selection being made between layer L.1 and layer L.$\beta$-1;

creating a list by arbitrarily picking one or more nodes from the selecting layer.

8. Method according to claim 7, wherein the Policy (5), (5.1) is a JSON script where the JSON keys are the layer-ID of the Hierarchical Model (3) and the JSON values are the node ID(s) of the layer.

9. Method according to claim 4, wherein in the Client creation process and the Client authentication process, the Client's Encoded Passcode Hierarchy (4) is generated by encoding the Client's passcode (7) into varied sizes based upon the sizes of each layer (L.1 to L.$\beta$-1) of the Hierarchical Model (3).

10. Method according to claim 1, wherein in the Client authentication process, the generation of the Client's Encoded Passcode (6) comprises the following steps, at the Client side:
  (i) entering the Client's passcode (7) to the Hierarchical Model (3) to generate the Client's Encoded Passcode Hierarchy (4);
  (ii) applying the Policy (5) to the Client's Encoded Passcode Hierarchy (4) to generate the Client's Encoded Passcode (6), being formed by grouping together the respective encoded passcodes.

11. Method according to claim 1, wherein in the Client authentication process, the generation of the expected encoded passcode (6) at the server-side, comprises the following steps:
  (i) upon receiving an authentication request by the Client (12), the server loads the Client's Encoded Passcode Hierarchy (4), and the Policy (5) shared with the Client (12);
  (ii) applying the Policy (5) to the Client's Encoded Passcode Hierarchy (4) to generate the expected encoded passcode (6), being formed by grouping together the respective encoded passcodes.

12. Method according to claim 1, wherein the Model creation process, the generation of the Client's Encoded Passcode Hierarchy (4) on the Client creation process, and the generation of the Policy (5), (5.1) on both the Client creation process and Client authentication process are executed at the server's side; and
  the Client (12) stores the Hierarchical Model (3) and the Policy (5), (5.1).

13. Method according to claim 12, wherein the Client creation process comprises the following steps:
  a Client (12) sends a Client creation request to a server administrator; the request comprising a Client's ID (10), a Client's passcode (7), and a token (11);
  upon successful token (11) validation by the server administrator, the Client's passcode (7) is used as input to the Regulated Activation Network computational model (2) to generate a Hierarchical model (3) and a respective Client's Encoded Passcode Hierarchy (4) for said Client's passcode (7);
  the Client's passcode (7) and the Client's Encoded Passcode Hierarchy (4) are saved at the server (9) as the Client's information;
  the server (9) generates a Policy (5) based on the Hierarchical model (3), and the generated policy (5) is saved at the server (9) with the Client's information as an expected Policy (5) for the next authentication attempt by the Client (12);
  a copy of the Policy (5) and the Hierarchical model (3) is sent to the Client (12) to be saved in the Client's system.

14. Method according to claim 1, wherein the Model creation process, the generation of the Client's Encoded Passcode Hierarchy (4), and the generation of the Policy (5), (5.1) on both the Client creation process and Client creation authentication process are executed at the Client's side; and
  the Server (9) stores the Client's Encoded Passcode Hierarchy (4) and the Policy (5), (5.1).

15. Method according to claim 14 wherein the Client's creation process comprises the following steps:
  a Client (12) sends a Client creation request to a server administrator; the request comprising a Client's ID (10), a Client's Encoded Passcode Hierarchy (4), a Policy (5), and a token (11) that is provided by the server administrator;
  upon successful token validation by the server administrator, the Client (12) is created with a unique ID;
  server (9) stores the Client's ID (10), the Client's Encoded Passcode Hierarchy (4), and the Policy (5) for the next authentication attempt by the Client (12).

* * * * *